United States Patent
Wang

(10) Patent No.: US 9,331,508 B2
(45) Date of Patent: May 3, 2016

(54) ELECTRONIC DEVICE CAPABLE OF TESTING USB CABLE AND METHOD FOR TESTING USB CABLE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yin-Zhan Wang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 226 days.

(21) Appl. No.: 14/226,497

(22) Filed: Mar. 26, 2014

(65) Prior Publication Data

US 2015/0002077 A1   Jan. 1, 2015

(30) Foreign Application Priority Data

Jun. 28, 2013   (CN) .......................... 2013 1 02684665

(51) Int. Cl.
*H02J 7/00*   (2006.01)
(52) U.S. Cl.
CPC ....... *H02J 7/0052* (2013.01); *H02J 2007/0062* (2013.01)
(58) Field of Classification Search
CPC ......................... H02J 7/0054; H02J 2007/0062
USPC ........................................................ 320/107
See application file for complete search history.

(56) References Cited

U.S. PATENT DOCUMENTS

| | | | |
|---|---|---|---|
| 2006/0181241 A1* | 8/2006 | Veselic | 320/107 |
| 2008/0122402 A1* | 5/2008 | Hoffman et al. | 320/110 |
| 2008/0212249 A1* | 9/2008 | Grewe et al. | 361/103 |
| 2010/0033018 A1* | 2/2010 | Fukasawa et al. | 307/80 |
| 2010/0127864 A1* | 5/2010 | Veselic | 340/540 |
| 2011/0254582 A1* | 10/2011 | Partee | 324/764.01 |
| 2013/0169219 A1* | 7/2013 | Gray | 320/108 |
| 2013/0200841 A1* | 8/2013 | Farkas et al. | 320/107 |
| 2014/0182257 A1* | 7/2014 | von Rentzell | 56/289 |
| 2015/0015186 A1* | 1/2015 | Xiang | 320/107 |
| 2015/0028797 A1* | 1/2015 | Miller et al. | 320/103 |

* cited by examiner

*Primary Examiner* — Suchin Parihar
(74) *Attorney, Agent, or Firm* — Novak Druce Connolly Bove + Quigg LLP

(57) ABSTRACT

The present disclosure provides a method for testing a USB cable applied in an electronic device. The electronic device includes a battery charged by a charger via the USB cable. The method can include determining at least two different values of charging currents. The method can further include generating a first control signal according to the determined values of charging currents. Sending the first control signal to the charger via the USB cable, to inform the charger to respectively charge the battery by charging currents with the determined values. Detecting values of at least two voltages output to the battery. Comparing a calculated variation degree between the detected values of voltages with a preset variation degree. Generating a first type of message according to a compared result between the calculated variation degree and the preset variation degree.

10 Claims, 3 Drawing Sheets

ELECTRONIC DEVICE CAPABLE OF TESTING USB CABLE AND METHOD FOR TESTING USB CABLE

FIELD

The present disclosure relates to electronic devices, and particularly to an electronic device capable of testing a universal serial bus (USB) cable and a method for testing USB cable.

BACKGROUND

The development of USB cable provides a way of supplying power from a charger (for example, a host system) to an electronic device. However, different USB cables may have different resistances, which generate different voltage drops across the USB cables when the battery of the electronic device is charged by the charger via the USB cables, respectively. Thus, the voltage output to the battery may not be satisfied when using an unmatched USB cable.

BRIEF DESCRIPTION OF THE DRAWINGS

Implementations of the present disclosure will now be described, by way of example only, with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views. The description is not to be considered as limiting the embodiments described herein.

DETAILED DESCRIPTION

Figure 1:
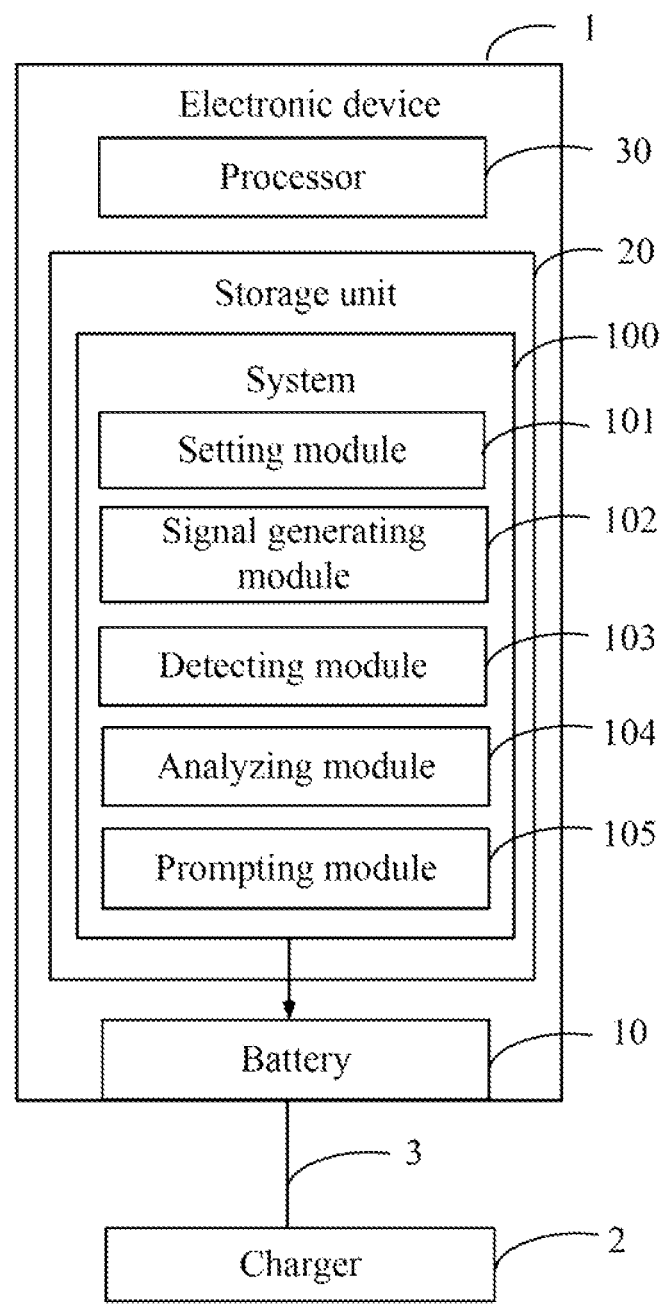
FIG. 1 is a block diagram of an electronic device having a battery charged by a charger via a USB cable, in accordance with an exemplary embodiment.

FIG. 1 is a block diagram of an electronic device 1 according to an exemplary embodiment. The electronic device 1, which for example can be a mobile phone, a tablet computer, or a multimedia player, can include a battery 10, a storage unit 20, and a processor 30. The storage unit 20 can store a range of values of charging currents supplied to the battery 10. When charged by a charging current with a value outside of the stored range, the battery 10 can be damaged. The storage unit 20 can further store a system 100. The system 100 can include a variety of modules which can be a collection of software instructions executed by the processor 30 to provide the functions of the system 100. In this embodiment, the system 100 can be executable by the processor 30 to detect a voltage drop across a USB cable 3 when the battery 10 is charged by a charger 2 via the USB cable 3, and can further determine whether the USB cable 3 is suitable for connecting the charger 2 to the battery 10 to deliver electrical power. In the illustrated embodiment, the battery 10 can be a lithium battery, and the stored range of values of charging currents can be from 500 mA to 2000 mA. The storage unit 20 can be a hard disk, a compact disk, or a flash memory, for example.

The processor 30 can be a central processing unit, a single chip, or a digital processor, for example.

FIG. 1 shows that the system 100 can include a setting module 101, a signal generating module 102, a detecting module 103, an analyzing module 104, and a prompting module 105.

The setting module 101 can obtain the stored range of values of charging current from the storage unit 20, and can determine at least two different values of charging currents within the stored range.

The signal generating module 102 can generate a first control signal according to the determined values of charging currents, and can send the first control signal to the charger 2 via the USB cable 3, thus informing the charger 2 to respectively charge the battery 10 by charging currents with the determined values. In the illustrated embodiment, the signal generating module 102 can first determine whether the battery 10 is connected to a charger 2 via a USB cable 3, and can generate the first control signal when determining that the battery 10 is connected to the charger 2.

The detecting module 103 can detect the values of at least two voltages output to the battery 10 after the signal generating module 102 sends the first control signal to the charger 2. In detail, since the charging current passes through the USB cable 3 and the battery 10 in sequence, a voltage drop can be generated across the USB cable 3. Thus, each detected value of the voltage output to the battery 10 can be equal to a total value of the voltage output by the charger 2 minus the value of the voltage drop across the USB cable 3. Moreover, the value of the voltage drop across the USB cable 3 can be proportional to the resistance value of the USB cable 3 and the value of the charging current supplied to the battery 10. Therefore, after connecting the charger 2 with the battery 10 via a USB cables 3, different voltage drops can be generated across the USB cable 3 when different charging currents are supplied to the battery 10. Namely, voltage drops across the USB cable 3 can be varied when different charging currents are supplied to the battery 10. Thus, different values of at least two voltages output to the battery 10 can be detected when the battery 10 is charged respectively by charging currents with the determined values.

The analyzing module 104 can calculate a variation degree between the detected values of voltages output to the battery 10, and can compare the calculated variation degree with a preset variation degree. For example, if the battery 10 is respectively charged by a first charging current and a second charging current with a greater value, a first detected value of voltage and a less second detected value of voltage can then be detected, and the variation degree can be a ratio calculated by the analyzing module 104 based on a difference between the first and the second detected values of voltages with respect to the first value of voltage. If the calculated variation degree is less than the preset variation degree, the USB cable 3 can be suitable for connecting the battery 10 with the charger 2 to deliver electrical power. Otherwise, the USB cable 3 can be not suitable for connecting the battery 10 to the charger 2 to deliver electrical power, which can generate a great voltage drop across the USB cable 3 and thus causing an electrical power loss.

Figure 2:
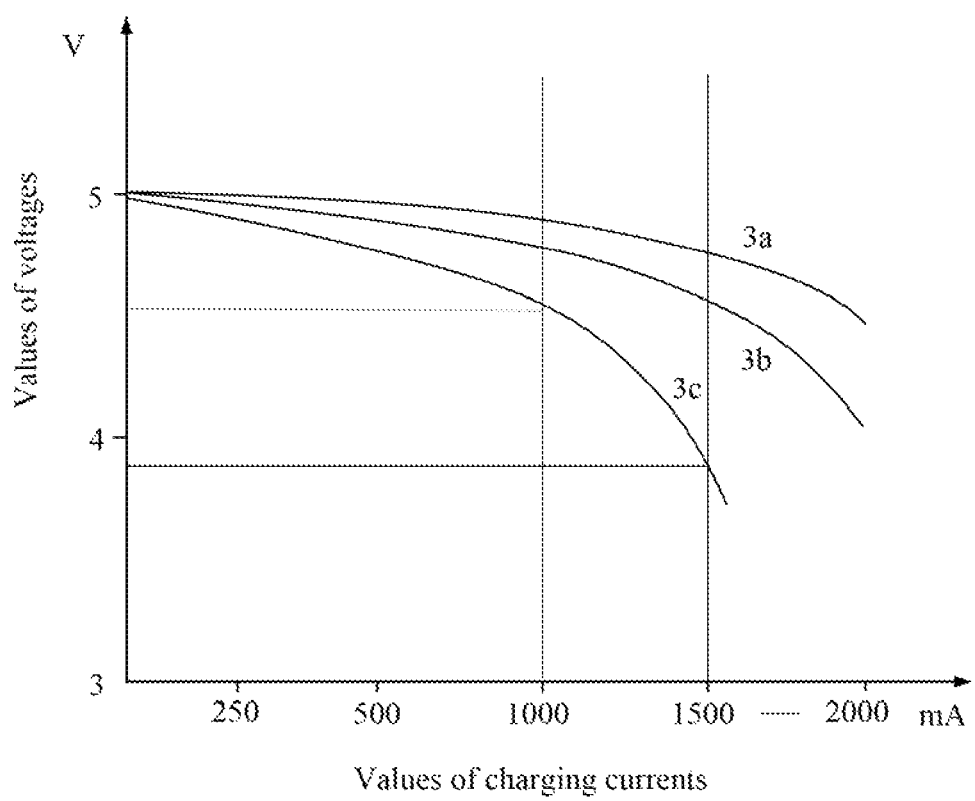
FIG. 2 is a perspective view showing a relationship between different voltage values output to a battery and different charging current values, in accordance with an exemplary embodiment.

FIG. 2 shows a relationship between different values of voltages output to the battery and values of charging currents, when using three different USB cables (for example, 3a, 3b and 3c) for connecting the charger with the battery. For example, the stored range of values of charging currents can be from 250 mA to 2000 mA, and two determined values of charging currents can be 500 mA and 1500 mA. For the USB cable 3c, the detected values of voltages output to the battery can be 4.6V and 3.8V when charging the battery respectively by the charging currents with the values of 500 mA and 1500 mA. Assuming the preset variation degree is 10%, the variation degree between the detected values of voltage can be calculated to be (4.6−3.8)/4.6=17.4%, which is greater than the preset variation degree 10%. Thus, the USB cable 3*c* is not suitable for connecting the charger 2 with the battery 10 to deliver electrical power from the charger to the battery.

The prompting module 105 can generate a first type of message according to the compared result determined by the analyzing module 104, to prompt the user whether or not the USB cable 3 can be suitable for connecting the charger 2 to the battery 10 to deliver electrical power. In the embodiment, the first type of message can be a text message output by a display (not shown) of the electronic device 1.

In the illustrated embodiment, if the calculated variation degree is greater than the preset variation degree, the USB cable 3 can be not suitable for connecting the charger 2 with the battery 10 to deliver electrical power. In this case, the prompting module 105 can further display an interface for a user to select whether to use the USB cable 3. If the user selects to use the USB cable 3, the analyzing module 104 can further select one value of charging current within the stored range which can be less than other values of the stored range. The signal generating module 102 can further generate a second control signal according to the selected value of charging current, and can send the second control signal to the charger 2 to inform the charger 2 to charge the battery 10 by the charging current with the selected value, thereby decreasing the electrical power loss across the USB cable 3.

In the illustrated embodiment, when at least two USB cables 3 are used, the analyzing module 104 can further sort all the USB cables 3 in a sequence according to the variation degree of each USB cable 3. The USB cable 3 having the least variation degree can be arranged first in the sequence. The prompting module 105 can further generate a second type of message including the sequence of the USB cables 3, to provide a prompt of priorities to the user to use the USB cables 3. For the above example, the analyzing module 104 can sort the USB cables 3*a*, 3*b* and 3*c* in a sequence as follows: USB cable 3*a* >USB cable 3*b* >USB cable 3*c*.

Figure 3:
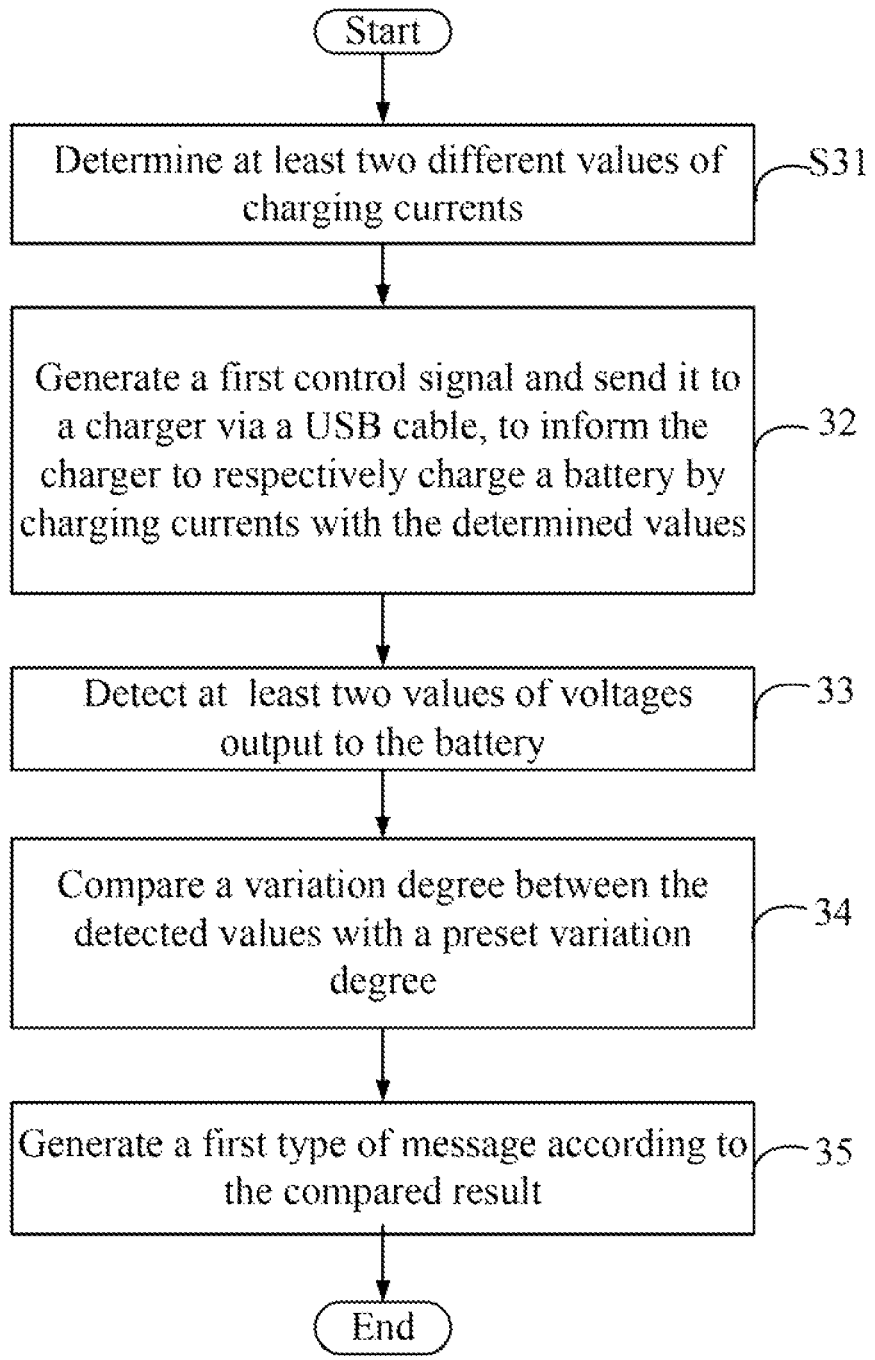
FIG. 3 is a flowchart of a method for testing the USB cable of FIG. 1, in accordance with an exemplary embodiment.

FIG. 3 is a flowchart of a method for testing the USB cable 3, in accordance with an exemplary embodiment.

In 31, the setting module obtains the stored range of values of charging currents from the storage unit, and determines at least two different values of charging currents within the stored range.

In 32, the signal generating module generates a first control signal according to the determined values of charging currents, and sends the first control signal to the charger via the USB cable, thus informing the charger to respectively charge the battery by charging currents with the determined values.

In 33, the detecting module detects the values of at least two voltages output to the battery after the signal generating module sends the first control signal to the charger.

In 34, the analyzing module calculates a variation degree between the detected values of voltage output to the battery, and compares the calculated variation degree with a preset variation degree.

In 35, the prompting module generates a first type message according to the compared result determined by the analyzing module, to prompt the user whether or not the USB cable is suitable for connecting the charger to the battery to deliver electrical power.

It is believed that the present embodiments and their advantages will be understood from the foregoing description, and it will be apparent that various changes may be made thereto without departing from the scope of the disclosure or sacrificing all of its material advantages, the examples hereinbefore described merely being exemplary embodiments of the present disclosure.

What is claimed is:

1. An electronic device comprising:
a battery being charged by a charger via a USB cable; and
a processor to execute a plurality of modules;
wherein the plurality of modules comprises:
a setting module configured to determine at least two different values of charging currents;
a signal generating module configured to generate a first control signal according to the determined values of charging currents, and send the first control signal to the charger via the USB cable, thus informing the charger to respectively charge the battery by charging currents with the determined values;
a detecting module configured to detect values of at least two voltages output to the battery after the signal generating module sends the first control signal to the charger;
an analyzing module configured to calculate a variation degree between the detected values of voltages, and compare the calculated variation degree with a preset variation degree; and
a prompting module configured to generate a first type of message according to a compared result between the calculated variation degree and the preset variation degree, to prompt a user whether or not the USB cable is suitable for connecting the charger to the battery to deliver electrical power.

2. The electronic device of claim 1 further comprising a storage unit, wherein the storage unit stores a range of values of charging currents and the plurality of modules further comprise a setting module configured to determine the at least two different values within the stored range.

3. The electronic device of claim 1, wherein the signal generating module is configured to first determine whether the battery is connected to the charger via the USB cable, and generate the first control signal when determining that the battery is connected to the charger.

4. The electronic device of claim 1, wherein the first type of message is a text message output by a display of the electronic device.

5. The electronic device of claim 2, wherein if the calculated variation degree is greater than the preset variation degree, the prompting module is further configured to display an interface for the user to select whether to use the USB cable, if the user selects to use the USB cable, the analyzing module is further configured to select one value of charging current within the stored range which is less than other values of the stored range, the signal generating module is further configured to generate a second control signal according to the selected value, and send the second control signal to the charger, to inform the charger to charge the battery by the charging current with the selected value.

6. The electronic device of claim 1, wherein when at least two USB cables are used, the analyzing module is further configured to sort all the USB cables in a sequence according to the variation degree of each USB cable, the USB cable having the least variation degree is arranged first in the sequence, the prompting module is further configured to generate a second type of message comprising the sequence of the USB cables.

7. A method for testing a USB cable applied in an electronic device, the electronic device comprising a battery charged by a charger via the USB cable, the method comprising:

- determining at least two different values of charging currents;
- generating a first control signal according to the determined values of charging currents;
- sending the first control signal to the charger via the USB cable, thus informing the charger to respectively charge the battery by charging currents with the determined values;
- detecting values of at least two voltages output to the battery;
- calculating a variation degree between the detected values of voltages;
- comparing the calculated variation degree with a preset variation degree; and
- generating a first type of message according to a compared result between the calculated variation degree and the preset variation degree, to prompt a user whether or not the USB cable is suitable for connecting the charger to the battery to deliver electrical power.

8. The method of claim 7, wherein the at least two different values of charging currents are within a range of values of charging currents stored in the electronic device.

9. The method of claim 7, wherein the first type of message is a text message output by a display of the electronic device.

10. The method of claim 8 further comprising:

- displaying an interface for the user to select whether to use the USB cable if the calculated variation degree is greater than the preset variation degree;
- selecting one value of charging current within the stored range which is less than other values of the stored range if the user selects to use the USB cable;
- generating a second control signal according to the selected value; and
- sending the second control signal to the charger, to inform the charger to charge the battery by the charging current with the selected value.

* * * * *